United States Patent [19]

Avonts

[11] Patent Number: 5,285,217
[45] Date of Patent: Feb. 8, 1994

[54] LED EXPOSURE HEAD

[75] Inventor: Kris P. Avonts, Bouwel, Belgium

[73] Assignee: AGFA-Gevaert N. V., Mortsel, Belgium

[21] Appl. No.: 846,918

[22] Filed: Mar. 6, 1992

[30] Foreign Application Priority Data

Apr. 4, 1991 [EP] European Pat. Off. ......... 91200785.3

[51] Int. Cl.⁵ ............................................. G01D 15/14
[52] U.S. Cl. .............................. 346/107 R; 346/139 R
[58] Field of Search ............... 346/107 R, 160, 76 L, 346/108, 139 R, 150, 1.1

[56] References Cited

U.S. PATENT DOCUMENTS

| 4,506,272 | 3/1985 | Arai | 346/76 PH |
| 4,536,778 | 8/1985 | De Schamphelaere et al. | 346/160 |
| 4,829,321 | 5/1989 | Iizuka et al. | 346/107 R |
| 4,875,057 | 10/1989 | Hediger et al. | 346/107 R |
| 4,896,168 | 1/1990 | Newman et al. | 346/107 R |
| 4,907,034 | 3/1990 | Doi et al. | 355/327 |
| 4,929,965 | 5/1990 | Fuse | 346/107 R |

FOREIGN PATENT DOCUMENTS

| 0270176 | 11/1986 | Japan | 346/76 PH |
| 0142665 | 6/1987 | Japan | 346/160 |
| 0216391 | 9/1988 | Japan | 346/107 R |

*Primary Examiner*—Benjamin R. Fuller
*Assistant Examiner*—David Yockey
*Attorney, Agent, or Firm*—William J. Daniel

[57] ABSTRACT

A LED exposure head for use in a recording device for linewise recording information on a moving photoconductor, which comprises a metal base plate (38) onto which are mounted a row of LED dice (39) along the centre, rows of integrated circuit chips (41, 42) and printed circuit boards (43, 44) outside of such rows of integrated circuit chips, and optical imaging means (30) for focussing the image of the LEDS in the image plane of the photoconductor. The base plate has a raised rib (52) for mounting the LED dice at a height above the base which is such that their electric bonding pads (53, 54) are at a level above that of the corresponding bonding pads (55, 56) of the integrated circuit chips (41, 42).

6 Claims, 5 Drawing Sheets

LED EXPOSURE HEAD

FIELD OF THE INVENTION

The present invention relates to a LED (light-emitting diode) exposure head for use in a recording device for linewise recording information on a moving light-sensitive support.

DESCRIPTION OF THE PRIOR ART

LED exposure heads are known that comprise an assembly in alignment of a plurality of sub-bases onto which are mounted a row of LED dice along the center, a row of integrated circuit chips at either side of the LED dice and printed circuit boards outboard of such rows of integrated circuit chips for electrically connecting the integrated circuit chips to electrical connectors, and optical imaging means for focussing the image of the LED'S onto the image plane of a photoconductor. The LED dice are electrically connected with the integrated circuit chips through so-called chip-to-chip bonds, and the integrated circuit chips are in the same way connected with the circuit boards.

The sub-bases are fitted to a common base and offer the advantage that they may be completely electrically and optically tested after their assembly before they are mounted one by one on the common base.

The sub-bases are usually the form of metal tiles of a light metal which has been gold-plated for the purpose of a good electrical conductivity and of preventing corrosion. The LED dice, the integrated circuit chips and the printed circuit boards are fitted to the sub-bases by adhesive bonding. One example of the described explosure head is disclosed in U.S. Pat. No. 4,536,778.

These LED exposure heads cause problems with undesired light reflections on the bonding wires from the LED dice towards the integrated circuit chips, as will be described hereinafter.

Another type of LED exposure heads is known in which there are no subbases but instead the distinct electronic components are mounted on one large ceramic substrate with printed conductor leads, the wire-bonding occurring from the LED dice to the substrate and from the substrate to the integrated circuit chips. This type of exposure head causes less problems with undesired reflections, but requires twice the number of bonding wires. Alternatively, the LED dice are directly wire-bonded to the integrated circuit chips. This technique is disclosed in JP-63 028 673.

The causes for undesired light reflections in the first type of LED exposure heads, and in more recent types in particular, are as follows.

Self-focussing lenses for focussing the image of the LED'S in the image plane of the photoconductor have become available with an increased depth of field. An increased depth of field leads to a better image quality but unfortunately also causes a better reproduction of undesirable light spots, such as reflections of the radiation beams of the LED'S on surrounding parts of the structure.

Further, the thickness of the LED dice is still getting smaller since a smaller thickness means a shorter thermic path from the light-emitting surface to the rearside of the LED'S whereby the heat-transfer for the active layer (i.e. the light-emitting layer) improves and the working temperature of said layer becomes lower. A lower temperature means more light since the temperature coefficient of a LED amounts to approximately $-0.7\%/°C$. Still further, the electric series resistance is smaller as the thickness of the LED chips becomes smaller.

Under such circumstances, it will be understood that the top surface with the bonding pads of the LED'S will be located lower than the top surface with the corresponding bonding pads of the integrated circuit chips. Since the electric wire connections from the LED'S to the integrated circuit chips are made by means of highly-reflective wires, such as gold wire in the case of thermocompression bonding, or aluminium wire in the case of ultrasonic bonding, it will be understood that as such wire, and more in particular the arc in its path from one pad to the other, will run at a smaller angle than before relative to a line perpendicular to the LED'S, the greater will be the risk for such arc to intersect the light cone emitted by a LED and thus for undesirable reflection of light from the intruding portion the wire.

It is possible to avoid undesired reflections of the kind described by intercepting the disturbing reflections of the image beam of the LED'S. This can be done by providing an elongated diaphragm between the LED'S and the lens, close to the LED'S. Since such diaphragm would need to have a precise slot with a width of approximately 0.5 to 1.0 mm for a length of 310 mm or more, it will be understood that it would be an expensive component, the location of which moreover would have to be very precise in order not to intercept a useful portion of the radiation beams.

SUMMARY OF THE INVENTION

Object of the Invention

It is the object of the invention to provide an improved LED exposure head which is not hampered by reflections from the electric connections between the pads of the LED'S and of the integrated circuit chips.

Statement of the Invention

In accordance with the present invention, a LED (light-emitting diode) exposure head for use in a recording device for linewise recording information on a moving light-sensitive support, said exposure head comprising at least one metal base plate onto which are mounted a row of LED dice along the centre, a row of integrated circuit chips on at least one side of the LED dice and a printed circuit board outside of such row of integrated circuit chips for electrically connecting the circuit boards to electric connectors, the thickness of the LED dice being smaller than that of the integrated circuit chips, and optical imaging means for focussing the image of the LED'S in the image plane of the light-sensitive support, is characterized in that said base plate has a raised rib for mounting the LED dice at a height above the base plate which is such that their electric bonding pads are at a level higher than that of the corresponding bonding pads of the integrated circuit chips, and wherein the paths of the wire bonded electric connections are such that they are out of contact with the light cones emitted by the LEDS.

A LED exposure head with a provision that causes the underside of the LED dice to take a position that is higher than that of the base plate on which they are mounted is known from JP-A 63-28673. In this particular case, the base plate is a ceramic structure and the mentioned provision is an electrode that puts the undersides of the adjacent LEDS in electrical contact. The LEDS have a thickness that equals that of the integrated circuit chips.

The raised rib according to the present invention is suitably located at the center of the base plate and has a width nearly that of the LED dice and a height such that the top of the LED dice is clearly higher than the top of the integrated circuit chips.

Since the thickness of the integrated circuit chips is larger than the thickness of the LED dice, it will be understood that the height of the mentioned rise will have to be larger than the difference in height between both components. Usual values of the height of the inventive raised ribs are between 0.2 and 1.0 mm but these values are not limitative for the present invention. According to a suitable embodiment of the invention, the raised rib on the base is obtained by erosion-etching of a flat metal plate thereby to leave the original thickness at the centre and to reduce the thickness at the locations where the integrated circuit chips and/or the printed circuit boards will be mounted on the base.

Although a LED exposure head according to the invention may comprise only one base with a plurality of LED dice, it is clear that a head suitably comprises a plurality of LED bases in the form of sub-bases which are mounted on a common supporting base.

The term "light-sensitive support" denotes in the present specification a photoconductor drum as known in the art of electrophotographic printers, but it encompasses also photoconductive and otherwise light-sensitive supports in sheet or belt from onto which an image may be formed via exposure by a LED exposure head.

BRIEF DESCRIPTION OF THE DRAWINGS

Detailed Description of the Invention

Figure 1:
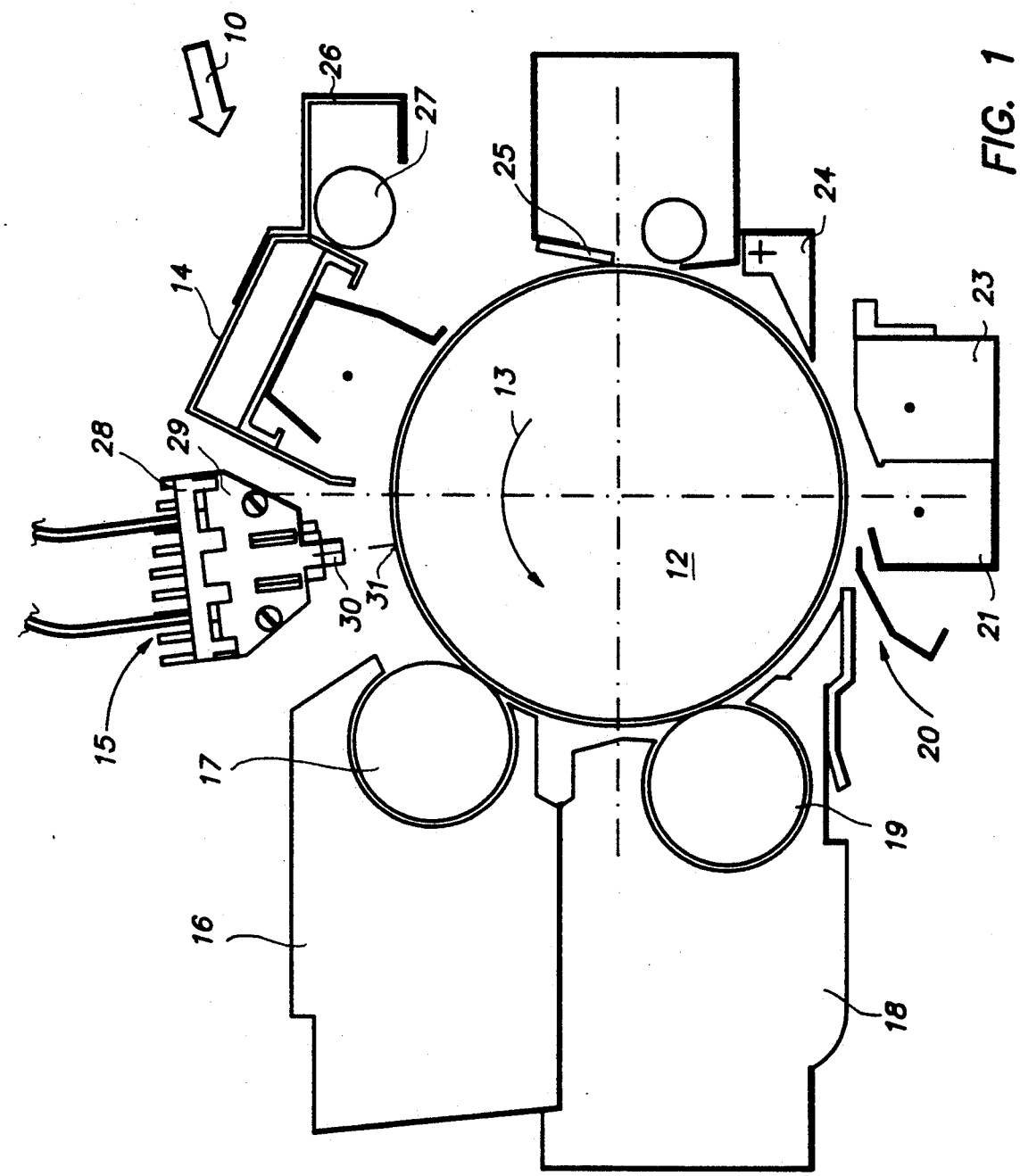
Figure 2:
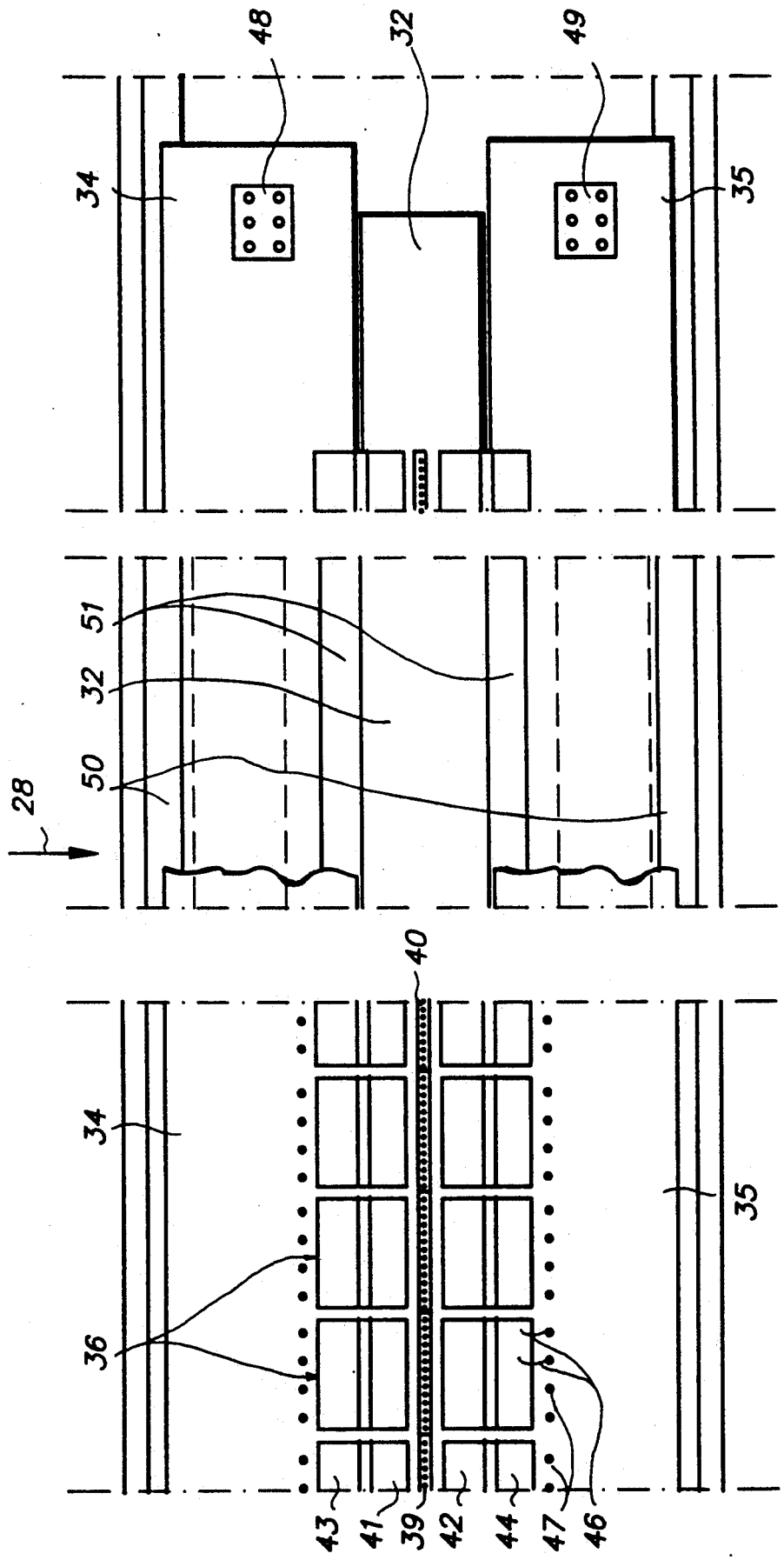
Figure 3:
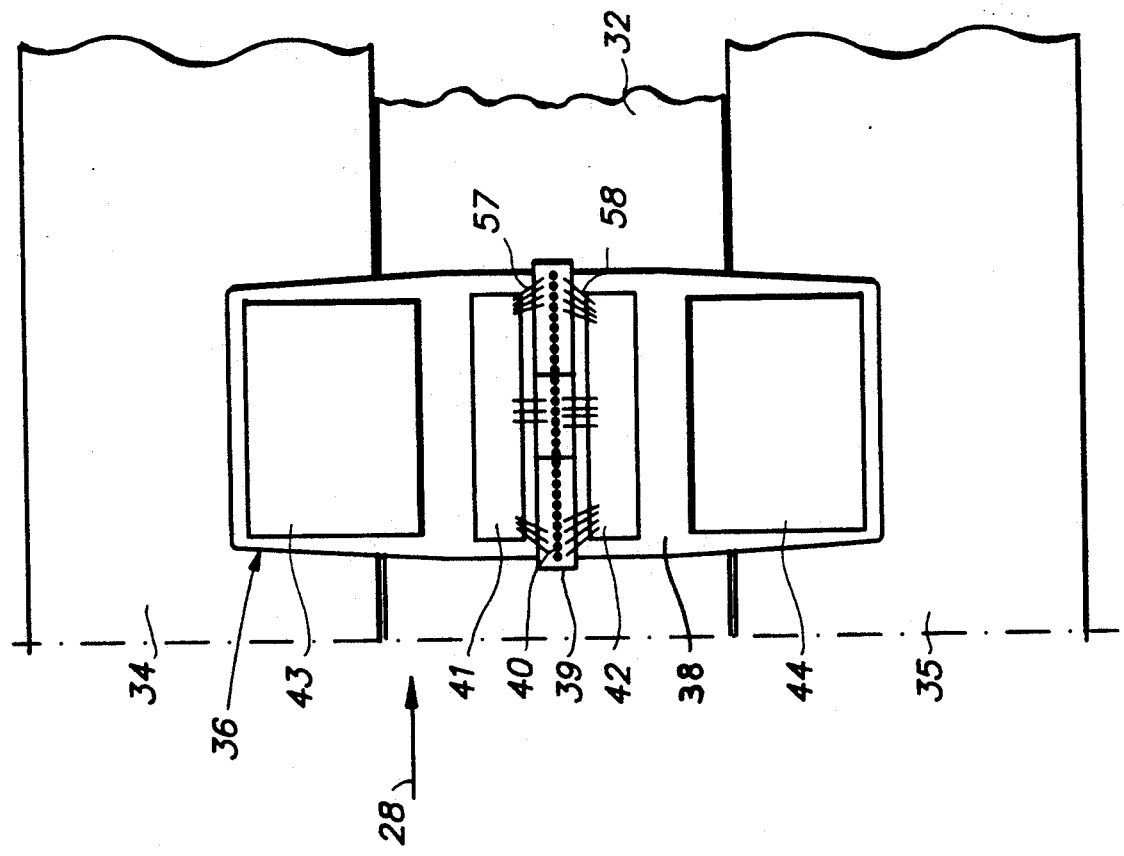
Figure 5:
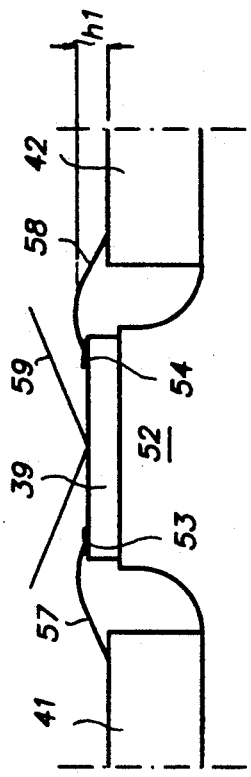
Figure 6:
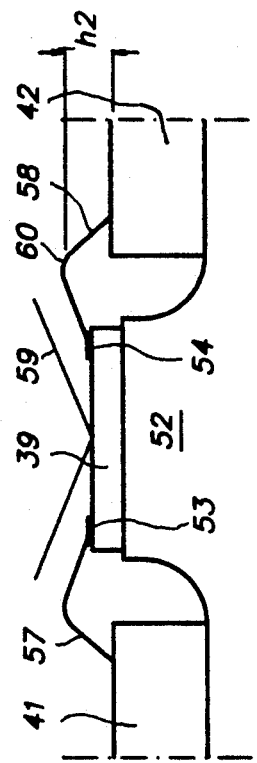
Figure 4:
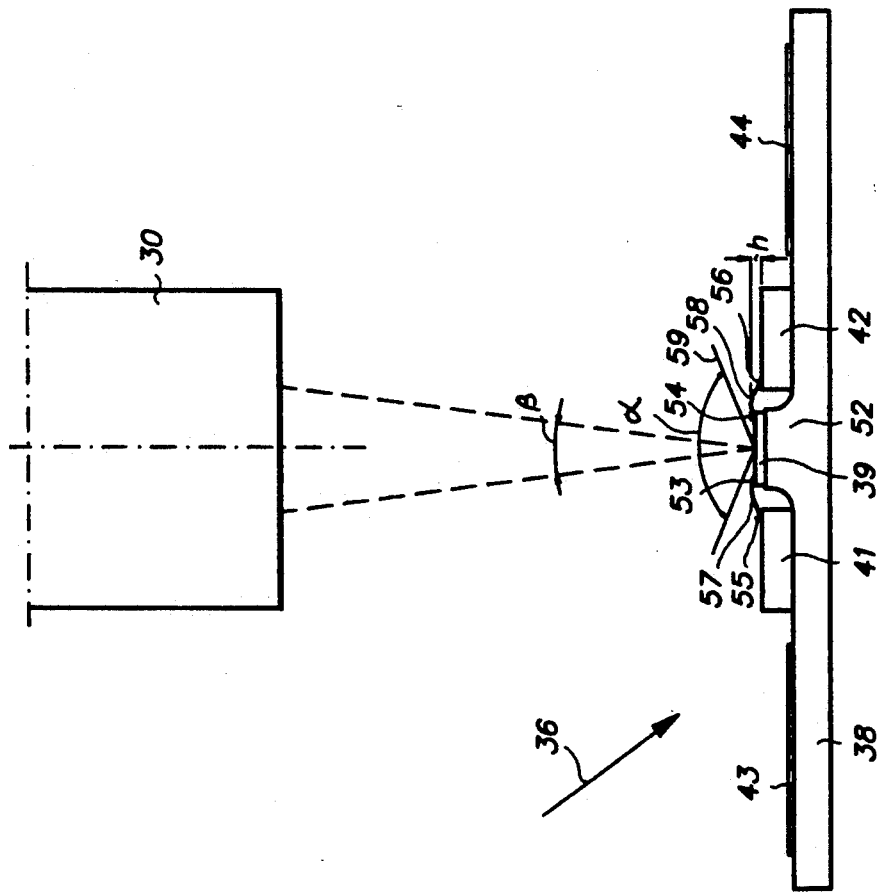
Figure 7:
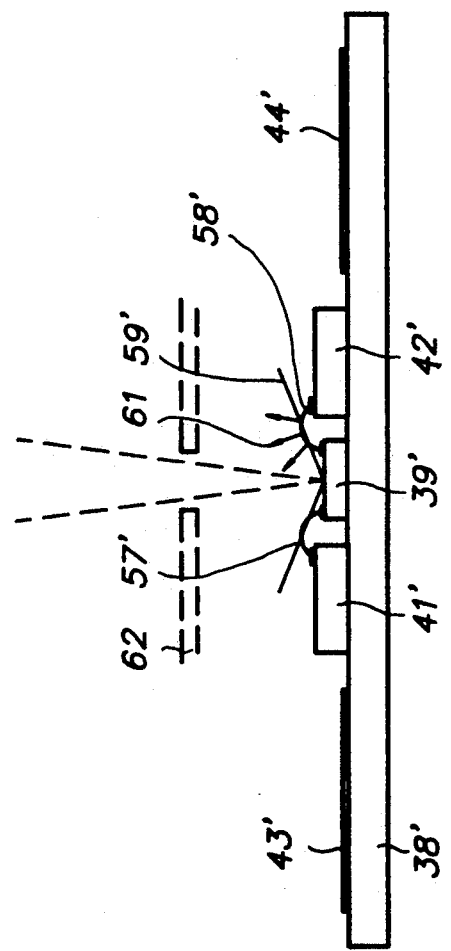

The invention will be described hereinafter by way of example with reference to the accompanying drawings, wherein FIG. 1 is a diagrammatic view of one embodiment of the engine of a xerographic recording apparatus. FIGS. 2A, 2B, and 2C are plan views of sections of the exposure head of the apparatus according to FIG. 1, FIG. 3 is an enlarged plan view of one LED module, FIG. 4 is an enlarged side view of one LED module, FIG. 5 is an enlarged view of the electric connections of a LED dice at a loop height $h_1$, FIG. 6 is an enlarged view of the electric connections of a LED dice at a loop height $h_2$, and FIG. 7 is an enlarged side view of a prior art LED module.

Referring to FIG. 1, the arrow 10 illustrates generally the engine of a xerographic printer. The term "engine" denotes the parts of the apparatus that are involved in the production of the image. A printer comprises a plurality of other parts such as a paper supply, a toner supply, a fixing station, drive means for rotation of the drum and for the paper transport, a toner fixing station, an electronic control circuit, etc. These parts are known in the art and are irrelevant for the understanding of the further description of the present embodiment of the invention.

The engine comprises a photoconductor drum 12 which may be an aluminium cylinder coated with a photosensitive photoconductor, and which is rotatable in the direction of the arrow 13. Around the drum are provided the following stations in angularly spaced relationship.

A corona-discharge station 14, which is used to uniformly electrostatically charge the surface of the drum 12.

A LED exposure head 15 for line-wise exposure of the charged surface of the photoconductor drum as its surface moves past the head.

A colour developing unit 16, which is arranged for applying coloured toner to the line-wise discharge drum surface by means of a developer sleeve 17, also called a magnetic brush.

A black-and-white developing unit 18, which is arranged for applying a black toner to the charge pattern on the drum by means of a developer sleeve 19.

A paper feed channel 20 through which a paper sheet is fed into contact with the drum for receipt of the toner image formed on the drum.

A corona transfer station 21 which applies a corona charge of a sign opposite to that of the toner to the underside of the paper to attract the toner from the drum onto the paper to form a visible, developed image.

A paper separation station 23 which applies charges to the paper so that it can be easily separated from the drum.

A paper separator 24 which functions to ensure that the paper sheet is reliably separated from the drum.

A cleaning blade 25 for scraping off residual toner left on the surface of the photoconductor drum after completion of the image transfer. This toner may be conveyed to a toner collecting bottle of the apparatus.

Finally, a main erase 26 which has a lamp 27 for neutralising any residual charge remaining on the surface of the photoconductor drum after cleaning.

In operation of the engine, the LED exposure head 15 receives a first image signal to produce on the photoconductor drum 12 a charge pattern that is developed by the black developing unit 18. The paper sheet that is removed by the separator 24 is passed through a toner fixing station which functions to melt the toner image into the paper sheet. The paper sheet is then returned by an appropriate conveying mechanism to the feed entry 20 for receiving a second toner image from the photoconductor drum, this time the colour image produced by the station 16 and by appropriate exposure by the head 15. An example of the use of the described two-colour development is that of a letter or advertising sheet, which bears a conventional black-and-white text, and the heading and/or the bottom of which bear(s) a coloured company logo.

The representation of FIG. 1 shows that the different stations around the photoconductor drum are located in closely spaced relationship. Both developing stations occupy an important part of the angular space around the photoconductor drum. A unit which readily lends itself to a reduction of its angular size without impairing the satisfactory operation of the printer, is the exposure head. More details about one embodiment of a compact LED exposure head can be found in EU Pat. Appl. 90 201 779 filed Jul. 3, 1990 and entitled: "LED exposure head with overlapping electric circuits".

The head 15 is mounted within a housing which is composed of a base 28 and a cover 29. The base may be an extrusion-moulded component of a light metal alloy, such as aluminium, with a plurality of cooling fins at the outside and four rectangular ribs, viz. two outer 50 and two inner ribs 51 (see FIG. 2) at the inside, whereas the cover has an elongate opening in which lens means 30 in the form of a "Selfoc" lens array is fitted for projecting the image of the LEDS of the exposure head onto a line 31 on the surface of the drum 12.

More details about a suitable construction of the housing of the exposure head can be found in EU Pat. Appl. 90 210 778, filed Jul. 3, 1990 and entitled: "LED exposure head".

The lay-out of the electronic circuitry of the exposure head is illustrated in the plan views of FIGS. 2A, 2B, and 2C. These three figures shows in fact three adjacent sections of the head, viz. the section being a true plan view, the section of FIG. 2B showing the base with the LED'S omitted and the section of FIG. 2C showing an end section of the head.

Base 28 whose inside is turned upwardly, is provided with an elongated copper bar 32, which is fitted in the space between two inner ribs 51 of the base by means of a thermally conductive adhesive that tolerates minor dimensional changes of the base and of the bar, caused by the heating of these elements at operation of the exposure head.

Two elongated circuit strips 34 and 35 are located on the base at either side of the bar 32. The thickness of the strips is slightly less than the distance over which the bar protrudes beyond the ribs 50 and 51.

A plurality of LED modules 36 are die-bonded in closely spaced side by side relationship to the bar 28 by means of an electrically and thermally conductive adhesive, such as a silver-filled epoxy adhesive.

Each LED module is in fact an assembly of the following components on a sub-base which is constituted by a tiny metal plate 38 (see FIG. 3).

A row of LED dice 39 with LEDS 40, which lie along the centre of the assembly and which are cemented to the front face of the plate 38 by means of an electrically and thermally conductive adhesive. Typically, each dice is about 8 mm long and about 1 mm wide.

On each side of the row of LED dice on each plate there is a row of integrated circuit chips 41 and 42 respectively, which are equally cemented in an electrically and thermally conductive way to the base plate. The chips can comprise the drivers for the LEDS, a shift register, a latch register and occasional further control and test circuits.

Outboard of the row of integrated circuit chips on each side of the center line there are printed circuit boards in the form of a conventional thick film circuit on a ceramic base, such as 43 and 45 which are equally cemented to the base plate. The circuit boards are connected through electric connections such as 46 with the elongate printed circuit strips 34 and 35 at connection points such as 47.

The two printed circuit strips 34 and 35 have end connectors such as 48 and 49 for bringing signals and power into the circuit.

Wire-bonded electric connections are provided between the LED dice 39 and the corresponding output pads of the integrated circuit chips 41 and 42, and between the input pads of the chips and the corresponding thick film circuits 43 and 44.

The improvement in accordance with the invention relates to the connections between the LED dice and the adjacent integrated circuit chips. This is illustrated in detail in FIG. 4, which shows a side view of one LED module 36.

The module comprises a sub-base in the form of a metal plate or tile 38, which has a central raised rib 52. The described cross-sectional shape of the sub-base can be obtained in different ways, such as by die-casting, die-stamping, or milling of a plate. We have found that a very suitable technique for the production of the sub-base consists in erosion-etching a conventional flat strip of copper or the like in such a way that a central ridge of original thickness is left, but that the opposed sides are uniformly reduced in thickness to the desired amount.

LED dice 39 are cemented in a row to the front face of the sub-base by means of an electrically conductive adhesive.

Each die has near either longitudinal end of its front face a row of bonding pads 53, and 54 respectively, for the LEDS. The pads have been illustrated in the figure by a short thick line on top of the LED but actually they lie in the plane of the front face of the dice. The mentioned pads are connected with corresponding bonding pads 55, 56 of the integrated circuit chips through two rows of wire-bonded electric connections 57 and 58. These connections are in the present example made by the ultrasonic bonding of an aluminium wire with a thickness of approximately 32 micrometer.

The bonding was done from the pads of the integrated circuit chips towards the corresponding pads of the LED dice.

Referring to the connections 58 by way of example, the capillary bonding tool of the bonding device is targeted on a bonding pad 56 of an integrated circuit chip 42. The tool descends bringing the free end of the wire in contact with the bonding pad. Ultrasonic energy is applied to bond the wire end, or the bead previously formed on it as the case may be, to the bonding pad. Then the tool rises to the loop height position h, the clamps of the tool being open so that wire is free to feed out the end of the capillary tool. The term "loop height" means the distance the tip of the bonding tool rises above the first bond. Simultaneously with its rising, the bonding tool is displaced in the direction of the corresponding pad 54 of the LED dice 39, wire being further pulled out from the tool. Then the tool deforms the wire against the bonding pad and while ultrasonic energy is applied a wedge-shaped bond is produced. With the tool still on the bond, the clamps move backward. This pulls at the bond and the wire will break at the thinnest cross-section of the bond. The tool then rises off the LED dice, leaving the wedge bond.

The wire loops thus formed have a configuration as shown by numerals 57 and 58. The loops comprise a first portion which runs upwardly, starting from the integrated circuit chips, and a second portion which slightly descends towards the LED dice. Since radiation of the LED'S occurs according to a light cone with an opening angle "Alpha", it is clear that there is a good clearance between a connection 58 and the adjacent boundary of the light cone as indicated by the line 59.

A fraction only of the emitted light is transmitted by the lens 30, since the angle at which such transmission can occur is indicated by "Beta". It should be noted that the relative dimensions of the different components in the drawing correspond almost with reality.

Finally, it is clear that there are also wire bonds between the integrated circuit chips 41, 42 corresponding thick film circuits 43, 44 but these bonds are well outside the radiation zone of the LEDS.

A detailed view of the exact configuration of the wire-bonded electric connections between the integrated circuit chips and the LED dice is shown for different loop heights in FIGS. 5 and 6.

Referring to FIG. 5, loop heigh $h_1$ is rather limited, in the present example 0.317 mm. This has the advantage of a good separation between the wire loops 57, 58 and the light cone 59, but the disadvantage that there is no sharp bending in the connection, what can be the cause of occasional rupture of the bond on the integrated circuit chip under the influence of bending stresses in the connecting wire. Therefore, a preferred bond is one as illustrated in FIG. 6, where $h_2$ equals 0.508 mm. The increased loop height is the cause that a noticeable kink 60 is produced in the wire loops as the bonding tool is lowered after it has been positioned above the bonding pad 54. In this way, bending stresses in the wire are seriously reduced.

The problem with the electric connections between the LED dice and the integrated circuit chips in prior art LED exposure heads is described hereinafter with reference to FIG. 7, in which same components received prime reference numerals.

The integrated circuit chips 41', 42' being thicker than the LED dice 39', it is clear that the electric connections 57' and 58' run markedly upwardly from the LED dice towards the integrated circuit chips, which gives rise to a serious risk for a portion of the loop of these connections intersecting the light cones of the LED'S as illustrated by the central portion of connection 58' intersecting boundary 59', of the light cone. A portion of the reflected light radiation, which is represented by the arrows 61, reaches the lens and is imaged on the photoconductor whereby corresponding development and toner transfer to the final image support occurs. Radiation is also reflected by connections 57' and 58' on adjacent connections and re-reflected from such connections towards the lens.

It is possible to intercept such undesired reflections by a mask as described in the introduction of this specification. Such mask is illustrated in broken lines 62 in the drawing, but it will be understood that the construction and the location of such mask must be very precise and also remain so at heating of the exposure head in operation.

The following data illustrate the LED module described with reference to FIG. 4.

| | |
|---|---|
| Dimensions of a sub-base plate 38 | 14.6 × 7.9 mm |
| Thickness of rib 52 | 1.0 mm (original thickness of the plate) |
| Length of rib 52 | 7.9 mm |
| Width of rib 52 | 1.0 mm |
| Thickness of etched portions | 0.6 mm |
| Thickness of LED dice 39 | 0.235 mm |
| Thickness of the integrated circuit chips | 0.500 mm |
| Height difference between LED dice and integrated circuit chips | 0.135 mm |
| Angle Alpha | 160° |
| Angle Beta | 24° |

The invention is not limited to the described embodiment. The LED dice may comprise two staggered rows of LEDS in order to increase the printing resolution.

The exposure head may comprise only one row of integrated circuit chips to drive the LEDS, rather than two rows as shown.

The sub-bases may be constructed in another way than by erosionetching, such as by die-stamping, or milling as mentioned already. The mounting means for the LED dice can also be obtained by providing a flat base plate with a central rib-like support which is fitted thereto, e.g. by soldering or brazing.

However, we have found that erosion-etching is a cheap method for manufacturing the sub-bases with good precision. Further, this technique allows the manufacturing of a plurality of sub-bases in a common supporting frame so that handling of these elements in view of the mounting of the electric components thereon, the application of the electrical bondings, etc. becomes easier.

I claim:

1. In a light-emitting diode (LED) exposure head for use in a recording device for linewise recording information on an image plane of a light-sensitive support, said exposure head comprising a metal base plate, said base plate having an elongated central region on which is mounted a row of LED chips each emitting an inverted cone of light having an axis generally perpendicular to said base plate and a generally flat body region on which is mounted at least one row of integrated circuit chips and at least one printed circuit board, each said row of circuit chips being arranged along a side of said row of LED chips and each said printed circuit board being disposed on a side of said at least one row of circuit chips remote from said row of LED chips and electrically connecting said circuit chips to electrical connectors, each of said LED chips and each of said circuit chips having a face thereof opposite said base plate on which is provided a bonding pad for attachment of an electrical connecting wire, said faces of said LED chips opposite said base plate lying in a generally common plane and said faces of said circuit chips opposite said base plate lying in a generally common plane which is different from the common plane of the faces of said LED chips, and electrical connecting wires attached between the bonding pads of the LED chips and the bonding pads of the circuit chips, whereby each of the LED chips is electrically connected to a corresponding one of said circuit chips, and optical imaging means for focusing an image forming a portion of said cone of light emitted by each of said LED chips onto the image plane of said light-sensitive support, said optical imaging means being held in spaced relation to said LED chips opposite said base plate, in combination, the improvement wherein said LED chips have a dimension perpendicular to the faces thereof opposite said base plate that is less than a dimension of said circuit chips perpendicular to the faces of said circuit chips opposite to said base plate, said central region of said base plate is constituted by an elongated rib elevated above the flat body region of the plate, the elevation of said elevated rib above said body region being such that the plane of the faces of said LED chips opposite said base plate lies higher above said flat body region of said base plate than does the plane of the faces of said circuit chips opposite said base plate, and said electrical wires connecting between the bonding pads of said LED chips and circuit chips extend along paths displaced outside the light cones emitted by said LED chips.

2. A LED exposure device according to claim 1 wherein said electrical wires are connected to the bonding pads of the integrated circuit chips and connected to the bonding pads of the LED dice.

3. A LED exposure device according to claim 1 wherein said base plate is a metal plate having a thickness reduced by erosion-etching except in the central region thereof to form said elongated rib.

4. A LED exposure device according to claim 1 wherein each of the electrical wires connecting between the bonding pads of said LED chips and circuit chips has a distinct angular bend therein.

5. A LED exposure head according to claim 1 which comprises a plurality of said metal base plates mounted in adjacent relationship on a surface of a common base.

6. A LED exposure head according to claim 1 wherein said common base has cooling fins on a surface thereof opposite to the surface thereof on which are mounted said metal base plates.

* * * * *